United States Patent

Fujii et al.

[11] Patent Number: 5,991,181
[45] Date of Patent: Nov. 23, 1999

[54] POWER CONVERSION APPARATUS

[75] Inventors: Toshiyuki Fujii; Shinzo Tamai, both of Tokyo; Megumu Morita, deceased, late of Izumi, by Yasue Morita, heiress; Yukao Tanaka, Osaka, all of Japan

[73] Assignees: Mitsubishi Denki Kabushiki Kaisha, Tokyo; Kansai Electric Power Co., Inc., Osaka, both of Japan

[21] Appl. No.: 09/054,405

[22] Filed: Apr. 3, 1998

[30] Foreign Application Priority Data

Oct. 3, 1997 [JP] Japan ................................. 9-271775

[51] Int. Cl.[6] ...................................................... H02M 3/24
[52] U.S. Cl. ................................................ 363/97; 363/95
[58] Field of Search .............................. 363/16, 20, 21, 363/34, 37, 95, 97, 123, 131

[56] References Cited

U.S. PATENT DOCUMENTS

| 4,328,454 | 5/1982 | Okuyama et al. | 363/79 |
| 4,672,520 | 6/1987 | Ueda et al. | 363/37 |
| 4,876,637 | 10/1989 | Mose et al. | 363/37 |
| 5,034,871 | 7/1991 | Okamoto et al. | 363/97 |

FOREIGN PATENT DOCUMENTS

| 1-238430 | 9/1989 | Japan . |
| 2-155435 | 6/1990 | Japan . |
| 2-155436 | 6/1990 | Japan . |

OTHER PUBLICATIONS

"Simulator Study of Multiterminal HVDC System Performance" Bergstrom et al, IEEE Transactions, vol. PAS–97, No. 6, 1978.

"Current Order Coordination in Multiterminal DC Systems" Nozari et al, IEEE Transactions, vol. PAS–100, No. 11, Nov. 1981.

*Primary Examiner*—Matthew Nguyen
*Attorney, Agent, or Firm*—Sughrue, Mion, Zinn, Macpeak & Seas, PLLC

[57] ABSTRACT

A power conversion apparatus has a voltage type power convertor, a power control circuit for outputting a first active power reference signal for the voltage type power convertor based on a power reference value Pref and a detection value P of a power detector, a DC voltage detector for outputting a second active power reference signal for the voltage type power convertor based on a DC voltage reference value Vdref and a detection value Vd of the DC voltage detector, and a gate control circuit for firing switching elements in the voltage type power convertor based on both first and second active power reference signals.

21 Claims, 10 Drawing Sheets

$|Vi|=k|Vs|$

POWER CONVERSION APPARATUS

BACKGROUND OF THE INVENTION

1. Field of the Invention

The present invention relates to a power conversion apparatus capable of increasing the stability of a multi-terminal direct current power transmission system in which a plurality of voltage power conversion apparatuses are connected to a direct current line, and also capable of continuously maintaining the operation of remaining power conversion apparatuses even if a terminal fault caused by a system fault or a fault of one of the power conversion apparatus occurs.

2. Description of the Prior Art

FIG.9 is a diagram showing a configuration of a conventional power conversion apparatus that has been disclosed in the Japanese Laid-Open Publication Number JP-A-1-238430. FIG.9 shows only one of a plurality of power conversion apparatuses connected to a direct current line. In FIG.9, the reference number 300 designates a power conversion apparatus to convert a Direct Current (DC) power to an alternating current (AC) power or the AC power to the DC power, 20 indicates an AC system, and 30 indicates a DC system. The reference number 301 designates a voltage type power conversion apparatus, 302 denotes an AC reactor or a transformer, and 303 indicates a capacitor. The reference number 304 designates an AC voltage detector for detecting the voltage of the AC system 20, and 305 indicates an AC current detector for detecting a current of the AC system 20. The reference number 306 designates a DC voltage detector for detecting the voltage of the DC system 30, and 307 indicates a power detection circuit to detect a power based on the voltage and the current detected by both the AC voltage detector 304 and the AC current detector 305. The reference number 308 designates a gate control circuit, 310 indicates a DC voltage control circuit, and 320 denotes a power control circuit. The reference numbers 311 and 321 designate subtracters, 312 and 322 denote compensators, and 330 indicates a selector.

Next, a description will be given of the operation of the conventional power conversion apparatus shown in FIG.9.

The power detection circuit 307 calculates an AC active power P=Vu*Iu+Vv*Iv+Vw*Iw based on each of three phase AC voltage values Vu, Vv, and Vw detected by the voltage detector 304 and each of three-phase AC values Iu, Iv, and Iw detected by the current detector 305. Then, the power detection circuit 307 outputs the calculated AC active power. Where, the reference character "*" designates a multiplication.

The AC active power P is approximately equal to the power that is converted by AC-DC conversion performed by the voltage type power convertor 301. The detected AC active power P is provided to the power control circuit 320. The subtractor 321 then calculates the deviation between the AC active power P and the power reference value Pref. The compensator 322 adjusts the power of the voltage type power convertor 301 according to the calculated the deviation of the power. That is, the compensator 322 increases the power of the voltage type power convertor 301 when the AC active power P detected by the power detector 307 is smaller in magnitude than that of the power reference value Pref. On the contrary, the compensator 322 decreases the power of the voltage type power convertor 301 when the AC active power P detected by the power detector 307 is larger in magnitude than that of the power reference value Pref. Thus, the compensator 322 controls the AC active power P such that P becomes equal in magnitude to the power reference value Pref.

On the other hand, the subtractor 311 calculates the deviation between the DC voltage Vd detected by the DC voltage detector 306 and the DC voltage reference value Vdref. Then, the compensator 312 adjusts the power of the voltage type power convertor 301 according to the calculated deviance of the voltage. Because the power of the voltage type power convertor 301 is adjusted bi-directionally, namely it is increased or decreased, the compensator 312 adjusts to increase the power from the AC to DC when DC voltage is decreased in order to charge the capacitor 303. On the contrary, the compensator 312 adjusts to decrease the power from the DC to AC when DC voltage is increased in order to discharge the capacitor 303. Thus, the compensator 312 adjusts Vd so that the value of the DC voltage Vd equals to the DC voltage reference value Vdref. Thus, both the compensators 312 and 322 adjust the power of the voltage type power convertor 301. In the conventional power conversion apparatus shown in FIG.9, the selector 330 selects the minimum value from the outputs of the compensators 312 and 322, and then one of the DC voltage control circuit 310 and the power control circuit 320 operates according to the selected value.

The gate circuit 308 controls to fire switching elements incorporated in the voltage type power convertor 301 according to the active power instruction Pac and the reactive power instruction Qac.

FIG.10 is a diagram showing a configuration of the voltage type power convertor 301 connected to AC power sources Vi and Vs through an AC reactor. In this case, when a voltage of the AC power source is Vs, a modulation index of the power convertor 301 is k, a reactance of the AC reactor is X, and a phase difference between the AC voltage of the voltage type power convertor 301 and the voltage of the AC power is φ, it is well known that the active power and the reactive power may be obtained by the following equations:

$$P = k * \sin \phi * V_s^2 / X \quad (1)$$

$$Q = (k * \cos \phi - 1) * V_s^2 / X \quad (2).$$

The gate circuit decides the timing to turn on and turn off switching elements in the voltage type power convertor 301 based on the modulation index k and the phase difference φ according to the equations (1) and (2), and then controls the switching elements in the voltage type power convertor 301. Thereby, the power of the voltage type convertor 301 is adjusted according to the outputs from the compensators 312 and 322 selected by the selector 330.

FIG. 11 is a diagram to explain the operation of the power conversion apparatus shown in FIG.9. In FIG. 11, the horizontal axis designates the AC active power P in which a positive direction from the left to the right indicates a power that is converted from AC to DC. The vertical axis indicates the DC voltage Vd of the voltage type power convertor 301.

The characteristic of the straight line showing a constant level of the voltage in a region shown by P<Pref, as shown in FIG. 11, indicates that the output of the compensator 322 becomes greater according to the amplification of the compensator 322 and then reaches the limit value when the AC active power P detected by the power detection circuit 307 is smaller than the power reference value Pref.

Because the DC voltage Vd is designated near the DC voltage reference value Vdref, and the compensator 312 outputs the value within the output limit value, the selector 330 for selecting the minimum signal value selects the output from the compensator 312 to operate the DC voltage control 310, and the DC voltage of the voltage type power convertor 301 controls Vd so that it reaches the DC voltage reference value Vdref.

When the AC active power P becomes greater than the power reference value Pref, the compensator 322 outputs a small value and the compensator 312 outputs a large value because the DC voltage Vd is smaller than the DC voltage reference value Vdref, so that the selector 330 selects the output of the compensator 322 and then the power control circuit 320 operates. In FIG. 11, a straight line showing a constant value Pref in the region Vd<Vdref indicates this characteristic. Accordingly, in the relationship between the power and the DC voltage in the conventional power conversion apparatus, the DC voltage control circuit 310 operates in one region and the power control circuit 320 operates in other region.

FIG. 12 is a diagram showing the connection configuration of conventional three power conversion apparatuses connected to the DC system. In FIG. 12, the reference numbers 300, 400, and 500 designate power conversion apparatuses, each having the same configuration as the conventional power conversion apparatus shown in FIG. 9. That is, each of the power conversion apparatuses 300, 400, and 500 has the configuration shown in FIG. 9.

In FIG. 12, the reference numbers 201, 211, and 221 indicate AC power sources, each of them is connected to each of the power conversion apparatuses 300, 400, and 500 through each of the AC systems 20, 21, and 22.

FIG. 13 is a diagram to explain the operation of the power conversion apparatuses having the configuration shown in FIG. 12. In FIG. 13, the solid line "a" indicates the power conversion apparatus 300, the dashed line "b" indicates the power conversion apparatus 400, and the dash-dotted line "c" denotes the power conversion apparatus 500.

In the case shown in FIG. 13, the DC voltage reference values Vdref1, Vdref2, and Vdref3 of the power conversion apparatuses 300, 400, and 500 are so set that they have the relationship Vdref1>Vdref2>Vdref3 and the power reference values Pref1, Pref2, and Pref3 are so set that they have the relationship Pref1<Pref2<Pref3.

As shown in FIG. 12, because three power conversion apparatuses 300, 400, and 500 are connected through the DC system 30 to each other, it must be required that they operate so that the sum of the powers of them becomes zero. For example, when the DC voltage is near the DC voltage reference value Vdref1, both the power conversion apparatuses 400 and 500 operate so that the power from AC to DC becomes small in order to decrease the magnitude of the voltage. Thereby, the DC voltage is decreased and the power control circuit 320 in the power conversion apparatus 300 operates.

Similarly, when the DC voltage is near the DC voltage reference value Vdref2, the power conversion apparatus 500 operates so that the power from AC to DC is decreased in order to decrease the DC voltage and the power conversion apparatus 400 operates under its control of the power control circuit.

Thus, when the three power conversion apparatuses having the configuration shown in FIG. 12 has the characteristic shown in FIG. 13, the power conversion apparatus 500 operates so that DC voltage has the DC voltage reference value Vdref3 and its power control circuit operates so that other power conversion apparatuses 300 and 400 have the power reference values Pref1 and Pref2. Accordingly, both the power conversion apparatuses 300 and 400 convert the AC power to the DC power, and the power conversion apparatus 500 converts the DC power, that is equal to the sum of the powers (Pref1+Pref2) of the power conversion apparatuses 300 and 400, to the AC power. The reference characters a', b', and c' designate the operation points of the power conversion apparatuses 300, 400, and 500, respectively.

We will consider the case in which the power conversion apparatuses having the configuration shown in FIG. 12 has the characteristic shown in FIG. 13. For example, because it is difficult to convert the DC power to the AC power when the operation of the power conversion apparatus 500 stops, the DC voltage is increased and the power conversion apparatus 400 operates so that the DC voltage becomes the DC voltage reference value Vref2. At this time, the reference characters a" and b" indicate the operation points of the power conversion apparatuses 300 and 400, respectively. The power control circuit 320 in the power conversion apparatus 300 is operating and the DC voltage control circuit in the power conversion apparatus 400 is operating so that the DC power that is equal to the power reference value Pref1 of the power conversion apparatus 300 is converted to the AC power.

As described above, when a plurality of conventional power conversion apparatuses are connected to the DC system 30, the DC voltage control circuit 110 in one of the power conversion apparatuses operates, and the power control circuits in the remaining power conversion apparatuses operate.

At this time, we will consider the case in which the power control circuit in the power conversion apparatus to convert the DC power to the AC power operates. When the voltage of the DC system 30 is decreased, a current flows so that the DC voltage is decreased in order to keep the power at a constant level. On the contrary, when the voltage of the DC system 30 is increased, the power control circuit 120 operates so that the DC voltage is further increased.

FIG. 14 is a circuit diagram to explain the above operation of the conventional power conversion apparatus. In FIG. 14, the configuration of each power conversion apparatus is the same as that of the power conversion apparatus shown in FIG. 9.

In FIG. 14, in the power conversion apparatus B in the power conversion apparatuses A, B, and C, the DC voltage control circuit of B operates as a voltage source, and the power control circuits in each of the power conversion apparatuses A and C operate as a current source.

When the AC active power P<0 of the power conversion apparatus A is a constant value, the DC current becomes P/Vd. When the voltage Ed of the DC system 30 is decreased based on an accident, for example, the operation of the power conversion C stops, the power conversion apparatus B adjusts the power in order to keep the voltage at a constant level. However, the power conversion apparatus A operates so that the capacitor Ca is discharged (from DC to AC, because P<0) corresponding to the decreasing of the DC voltage. Thereby, the power conversion apparatus B must provide a charging current for the capacitor Ca. But, when the length of the DC system is long, the power conversion apparatus B adjusts the power by using the voltage that is different from the voltage of the capacitor in the power conversion apparatus A. Accordingly, in some cases, deterioration of the control function of the DC voltage happens. Specifically, because it is often caused to increase a phase delay caused by resonance of an inductance component in the DC system and the capacitor of each power conversion apparatus, an underdamped voltage control characteristic is caused. When the distance of the DC system is long, the stability of the system comprising the power conversion apparatuses becomes jeopardized because the difference between the voltage of the capacitor requiring charging and the voltage adjusted by the DC voltage control circuit 110 becomes larger. In addition, when the capacitance of the capacitor C is smaller, the time length of discharging becomes short, the DC voltage control circuit must supply the charging current to the capacitor C. However, because the difference between the voltage of the capacitor requiring charging and the voltage adjusted by the DC voltage control circuit 110 increases, the control characteristic of the DC voltage control circuit 110 becomes undesirable and the degree of the stability of the system is decreased.

Thus, because the conventional power conversion apparatus has the configuration described above, one of a plurality of power conversion apparatuses controls the DC voltage and each of other power conversion apparatuses controls each power. Thereby, the power conversion apparatus to convert the DC power of the DC system 30 to the AC power of the AC system 20 controls so that the current further flows in order to decrease the DC voltage when the DC voltage of the DC system 30 is decreased, and, on the contrary, the DC voltage is further increased when the DC voltage of the DC system 30 is increased. As a result, the DC voltage control characteristic becomes unstable according to the increasing of the distance of the DC system 30 and the decreasing of the capacitance of the capacitor. There is therefore a drawback in the conventional power conversion apparatus that the deterioration of the DC voltage control circuit affects the ability of the AC system because it is difficult to adequately suppress a variation of the DC voltage caused by the resonance in the DC system 30.

SUMMARY OF THE INVENTION

Accordingly, an object of the present invention is, with due consideration to the drawbacks of the conventional power conversion apparatus, to provide a power conversion apparatus capable of improving the characteristic of a power system in which a plurality of the power conversion apparatuses are connected, capable of suppressing a resonance in a DC system, and capable of supplying a power stability.

Further, another object of the present invention is to provide a power conversion apparatus capable of continuously performing its operation even if the operation of one or more other power conversion apparatuses stop.

Moreover, another object of the present invention is to provide a power conversion apparatus in which a rate of a power supply among a plurality of power conversion apparatuses may be set in each power conversion apparatus when the operations of one or more of power conversion apparatuses stop and the remaining power conversion apparatuses operate.

Furthermore, another object of the present invention is to provide a power conversion apparatus capable of reducing a variation of a power immediately following the stop operations of one or more power conversion apparatuses.

In addition, another object of the present invention is to provide a power conversion apparatus in which a rate of a transitional power supply among a plurality of power conversion apparatuses may be set in each power conversion apparatus immediately following the stop operations of one or more of the power conversion apparatuses.

Moreover, another object of the present invention is to provide a power conversion apparatus in which a rate of a power supply among a plurality of power conversion apparatuses may be set in each power conversion apparatus corresponding to the ability of each AC system connected to each power conversion apparatus, immediately following the stop operations of one or more of the apparatuses.

Furthermore, another object of the present invention is to provide a power conversion apparatus in which a rate of a transitional power supply among a plurality of power conversion apparatuses may be set in each power conversion apparatus corresponding to the ability of each AC system connected to each power conversion apparatus, immediately following the stop operations of one or more of the apparatuses.

In accordance with a preferred embodiment of the present invention, a power conversion apparatus in a plurality of power conversion apparatuses forming a power system, each apparatus including a voltage type power convertor for converting a DC power to a AC power or the AC power to the DC power and for supplying a converted power, connected to DC lines, comprises direct current voltage detection means for detecting the DC voltage of each voltage type power converter, power detection means for detecting the power converted from the AC power to the DC power or from the DC power to the AC power by the voltage type power convertor, power control means for outputting a first active power reference signal for the voltage type power convertor based on a power reference value and a detected value detected by the power detection means, direct current control means for outputting a second active power reference signal for the voltage type power convertor based on a direct current voltage reference value and a detected value detected by the direct current voltage detection means, and gate control means for firing switching elements incorporated in the voltage type power convertor based on the first active power reference signal and the second active power reference signal.

In the power conversion apparatus as another preferred embodiment of the present invention, a limit value for limiting a magnitude of the first active power reference signal is set in the power control means, and the magnitude of the first reference signal output from the power control means is limited based on the limit value.

In the power conversion apparatus as another preferred embodiment of the present invention, a different output limit value is set in each power control means for each voltage type power convertor in each power conversion apparatus.

In the power conversion apparatus as another preferred embodiment of the present invention, the direct current voltage control means in each voltage type power convertor further comprises a change rate suppress means to suppress a change rate per time of an output signal transferred from the direct current voltage detection means.

In the power conversion apparatus as another preferred embodiment of the present invention, a different set value is set in the change rate suppress means for each voltage type power convertor in each power conversion apparatus.

In the power conversion apparatus as another preferred embodiment of the present invention, the different output limit value to be set in the power control means is set according to an ability of power supply of an alternating current system connected to each voltage type power convertor in each power conversion apparatus.

In the power conversion apparatus as another preferred embodiment of the present invention, the different limit value to be set in the change rate control means is set according to an ability of power supply of an aternating current system connected to each voltage type power convertor in each power conversion apparatus.

In the power conversion apparatus as another preferred embodiment of the present invention, a different direct current gain is set into the direct current voltage control means in each voltage type power convertor in each power conversion apparatus.

In the power conversion apparatus as another preferred embodiment of the present invention, the power control means comprises a subtractor and a compensator, the subtractor receives the power reference value and the detected value detected by the power detection circuit, and the output limit value is set in the compensator, and the compensator receives an output from the subtractor, and outputs the first active power reference signal.

In the power conversion apparatus as another preferred embodiment of the present invention, the direct current voltage control means comprises a subtractor and a compensator, the subtractor receives the direct current voltage reference value and a direct current voltage value detected by the direct current voltage detection means, and the compensator receives an output from the subtractor and outputs the second active power reference signal.

In the power conversion apparatus as another preferred embodiment of the present invention, a maximum change rate that is corresponding to an allowable power supply ability of the AC power connected to each voltage type power convertor is set in the change rate suppress means.

BRIEF DESCRIPTION OF THE DRAWINGS

These and other objects, features, aspects and advantages of the present invention will become more apparent from the following detailed description of the present invention when taken in conjunction with the accompanying drawings, in which.

DESCRIPTION OF THE PREFERRED EMBODIMENTS

Other features of this invention will become apparent through the following description of preferred embodiments which are given for illustration of the invention and are not intended to be limiting thereof.

Preferred embodiments of the power conversion apparatus according to the present invention will now be described with reference to the drawings.

First Embodiment

In the following preferred embodiments of the present invention, we will describe various cases in which the power conversion apparatus control circuit is realized by using a control circuit. However, the present invention is not limited by those embodiments, for example, it is acceptable to realize the power conversion apparatus by using a microprocessor and software.

Figure 1:
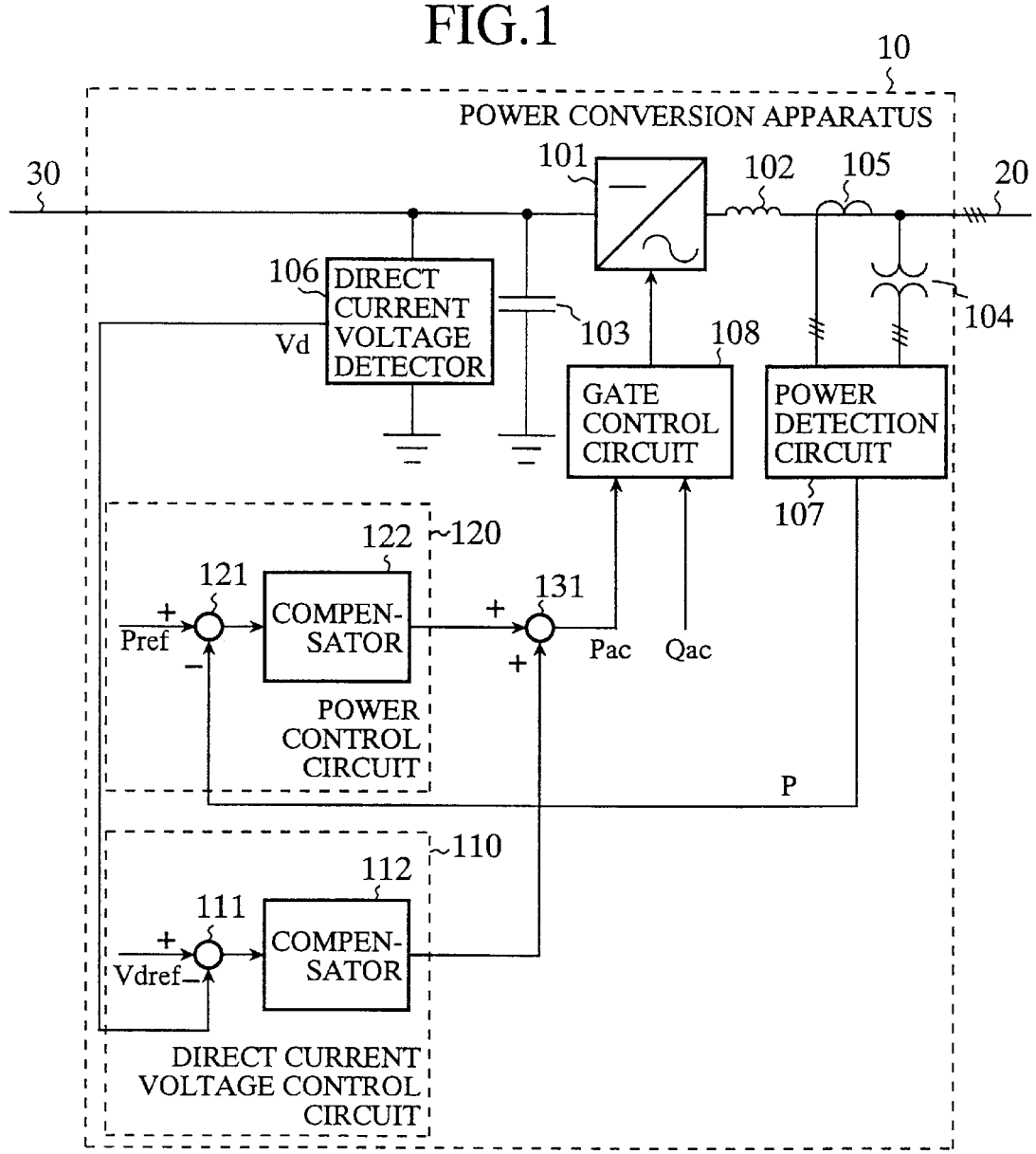
FIG. 1 is a diagram showing a configuration of a power conversion apparatus as a first embodiment according to the present invention.

FIG. 1 is a diagram showing a configuration of the power conversion apparatus as the first embodiment according to the present invention. Specifically, FIG. 1 shows only one power conversion apparatus as the first embodiment that is one of a plurality of power conversion apparatuses connected to direct current (DC) lines in the DC system.

In FIG. 1, the reference number 10 designates a power conversion apparatus to convert a DC power to an AC power. The reference number 20 denotes an AC system (including AC lines), and 30 indicates a DC system (including DC lines). The reference number 101 designates a voltage type power convertor, 102 denotes an AC reactor or a transformer. The reference number 103 indicates a capacitor. The reference number 104 designates an AC voltage detector to detect the voltage of the AC system 20, and 105 indicates an AC current detector to detect a current of the AC system 20. The reference number 106 designates a DC voltage detector to detect the voltage of the DC system 30, and 107 indicates a power detection circuit to detect a power based on the voltage and the current detected by both the AC voltage detector 104 and the AC current detector 105. The reference number 108 designates a gate control circuit. The reference number 110 indicates a DC voltage control circuit to output a second active power reference signal for the voltage type power convertor 101 based on the DC voltage reference value Vdref and the value detected by the DC voltage detector 106. The reference number 120 denotes a power control circuit to output a first active power reference signal for the voltage type power convertor 101 based on the power reference value Pref and the value detected by the power detector 107. The reference numbers 111 and 121 designate subtracters, 112 and 122 denote compensators, and 131 indicates an adder.

Next, a description will be given of the operation of the power conversion apparatus of the first embodiment shown in FIG. 1.

The power detection circuit 107 in the power conversion apparatus 10 calculates an AC active power P=Vu*Iu+Vv*Iv+Vw*Iw based on each of three phase AC voltage values Vu, Vv, and Vw detected by the voltage detector 104 and each of three phase AC values Iu, Iv, and Iw detected by the current detector 105. Then, the power detection circuit 107 outputs the calculated AC active power. Where, the reference character "*" designates a multiplication. The AC active power P is approximately equal to the power that is converted by AC-DC conversion performed by the voltage type power convertor 101. The detected AC active power P is provided to the power control circuit 120. The subtractor 121 then calculates the difference or the deviance between the AC active power P and the power reference value Pref. The power control circuit 120 amplifies the power difference and then outputs the active power instruction value (a first active power reference signal) Pac. It is thereby so adjusted that the AC active power P becomes equal to the power reference value Pref.

Next, the operation of adjustment of the DC voltage executed by the voltage type power convertor 101 will be explained.

Because the AC active power P of the voltage type power convertor 101 is approximately equal to the DC power (in general, this assumption is correct because the power convertor has a small loss.), the current flowing from the voltage type power convertor 101 to the capacitor 103 becomes Pac/Vd (where, Vd designates a DC voltage of the DC system). Accordingly, a charging current flows to the capacitor 103 and the voltage is increased when the magnitude of the active power instruction value Pac is increased in positive direction. On the contrary, a discharging current flows from the capacitor 103 and the voltage is decreased when the magnitude of the active power instruction value Pac is increased in negative direction. The compensator 112 outputs a second effective reference signal so that the DC voltage Vd becomes equal to the DC voltage reference value Vdref, that is the compensator 112 operates so that the active power instruction value Pac for the voltage type power convertor 101 is increased when the DC voltage Vd detected by the DC voltage detector 106 is smaller than the DC voltage instruction value Vdref, and on the contrary, the active power instruction value Pac for the voltage type power convertor 101 is decreased when the DC voltage Vd detected by the DC voltage detector 106 is greater than the DC voltage instruction value Vdref.

Figure 2:
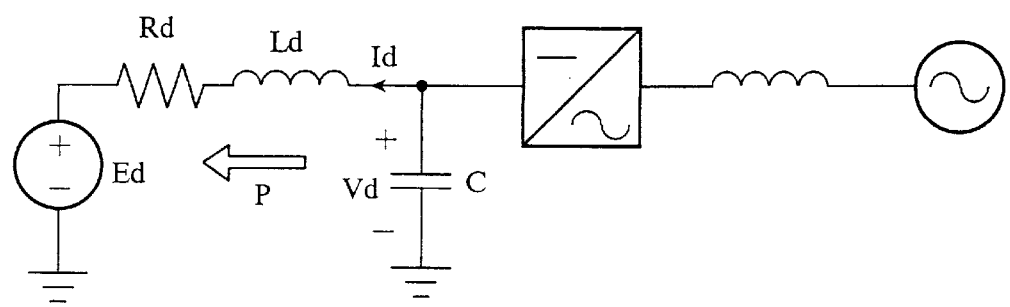
FIG. 2 is a diagram showing an equivalent circuit of the operation of the voltage type power convertor in the power conversion apparatus of the first embodiment.

FIG. 2 is a diagram showing an equivalent circuit of the operation of the voltage type power convertor 101 in the power conversion apparatus of the first embodiment.

Figure 3A:
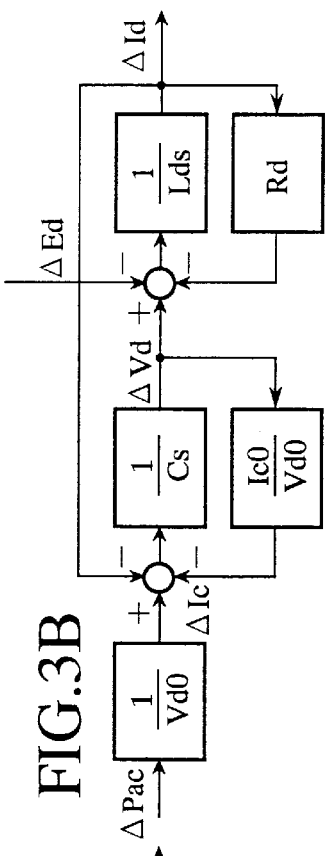
FIGS. 3A to 3D are diagrams showing equivalent block diagrams of the voltage type power convertor shown in FIG. 2.
Figure 3B:
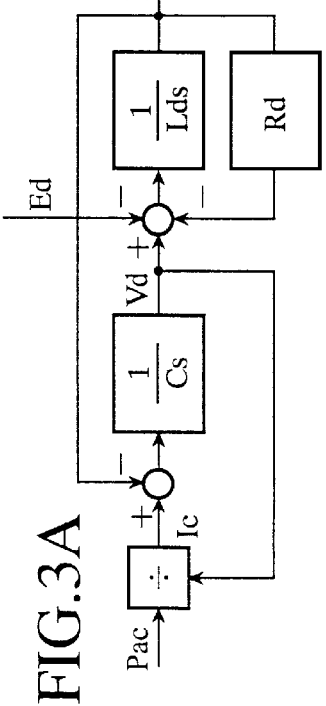
Figure 3C:
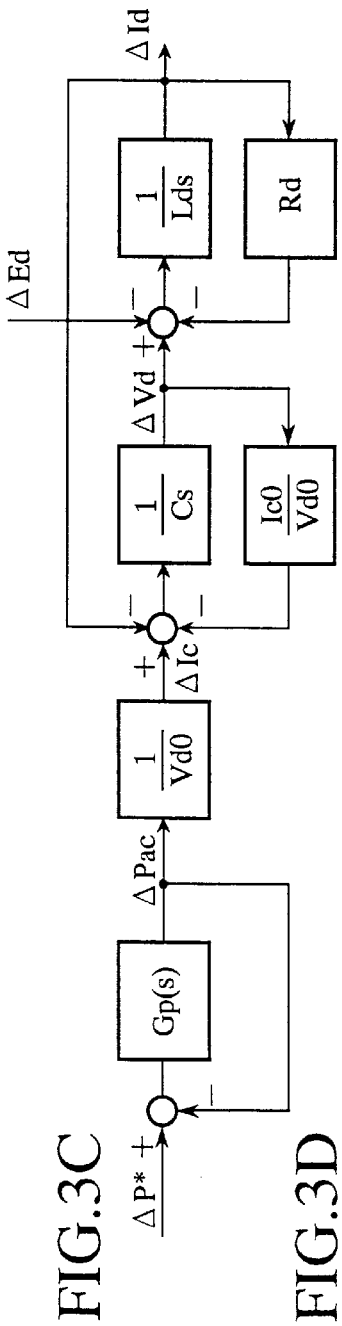
Figure 3D:
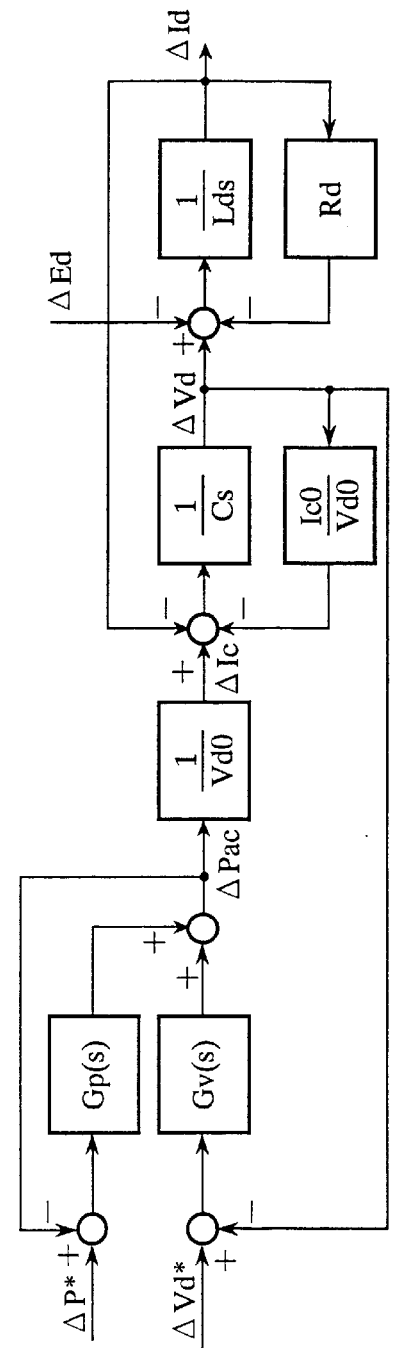

FIGS. 3A, 3B and 3D are diagrams showing equivalent block diagrams of the voltage type power convertor 101 shown in FIG. 2. FIG. 3A shows an equivalent block diagram of the active power instruction value Pac to the current Id in the DC line in the voltage type power convertor 101. The active power instruction value Pac is the input power of the AC system of the voltage type power convertor 101 and it has a positive value when the AC power is converted to the DC power (in a rectifier operation), and has a negative value when the DC power is converted to the AC power (in an inverter operation).

Because both AC power and the DC power in the voltage type power convertor 101 are equal when a loss of the voltage type power convertor 101 is neglected, the DC current Ic in the voltage type power convertor 101 has the following relationship: Ic=Pac/Vd. (see the reference character "÷" in the division block shown in FIG. 3A)

The block 1/Cs shown in FIG. 3A indicates that the capacitor 103 is charged and discharged by the difference between the current Ic of the voltage type power convertor 101 and the current Id in the DC system 30, and then the voltage Vd of the capacitor 103 is changed. The following blocks 1/Lds and Rd denote that the difference between the voltage Vd of the capacitor 103 and the voltage Ed of another terminal (as another power conversion apparatus connected to the DC system 30) is applied to an inductance and a resistance of the DC system 30 and then the DC current Id flows. In order to evaluate the equivalent block diagram shown in FIG. 3A, Taylor expansion of the division is executed and the result of a linearization of it that is near an operation point is shown in FIG. 3B. Where, operation points are (ΔVd0, Ic0, Id0, Ed0, Pac0), infinitesimally changes are (ΔVd, ΔIc, ΔId, ΔEd, ΔPac), Vd=Vd0+ΔVd, Ic=Ic0+ΔIc, Id=Id0+ΔId, Ed=Ed0 +ΔEd, and Pac=Pac0+ΔPac.

As clearly shown in the equivalent block diagram of FIG. 3B, there is a loop having the coefficient Ic0/Vd0 from the voltage ΔVd to the current (as inputs to the block 1/Cs) in the capacitor 103.

The condition that the loss of the voltage type power convertor 101 is neglected has a relationship Ic0/Vd0=Pac0/(Vd0*Vd0) because Ic0=Pac0/Vdc0. The sign of the coefficient Ic0/Vd0 is therefore changed according to the direction (AC to DC or DC to AC) of conversion of the power executed by the voltage type power convertor 101. That is, the coefficient becomes a positive value in the rectifier operation and a negative value in the inverter operation.

For example, the DC voltage is Vd0>0 and when the voltage type power conversion 101 operates in the backward conversion direction, the relationship (Ic0/Vd0)<0 is satisfied. Because the value of change becomes a negative value, that is ΔVd<0, when the DC voltage (that is equal to the voltage of the capacitor) of the voltage type power convertor 101 is decreased, the relationship (Ic0/Vd0)*ΔVd>0 is satisfied. As a result, the current flowing through the capacitor is decreased and the voltage of the capacitor is also decreased.

On the contrary, when the DC voltage of the voltage type power convertor 101 is increased, that is ΔVd>0, and (Ic0/Vd0)*ΔVd<0, the current flowing through the capacitor is increased, and the voltage of the voltage type power convertor 101 is further increased. That is, there is a positive feedback in the system when the voltage type power convertor 101 is in the rectifier operation. Accordingly, the stability of the system is determined by controlling the positive feedback.

Figure 9:
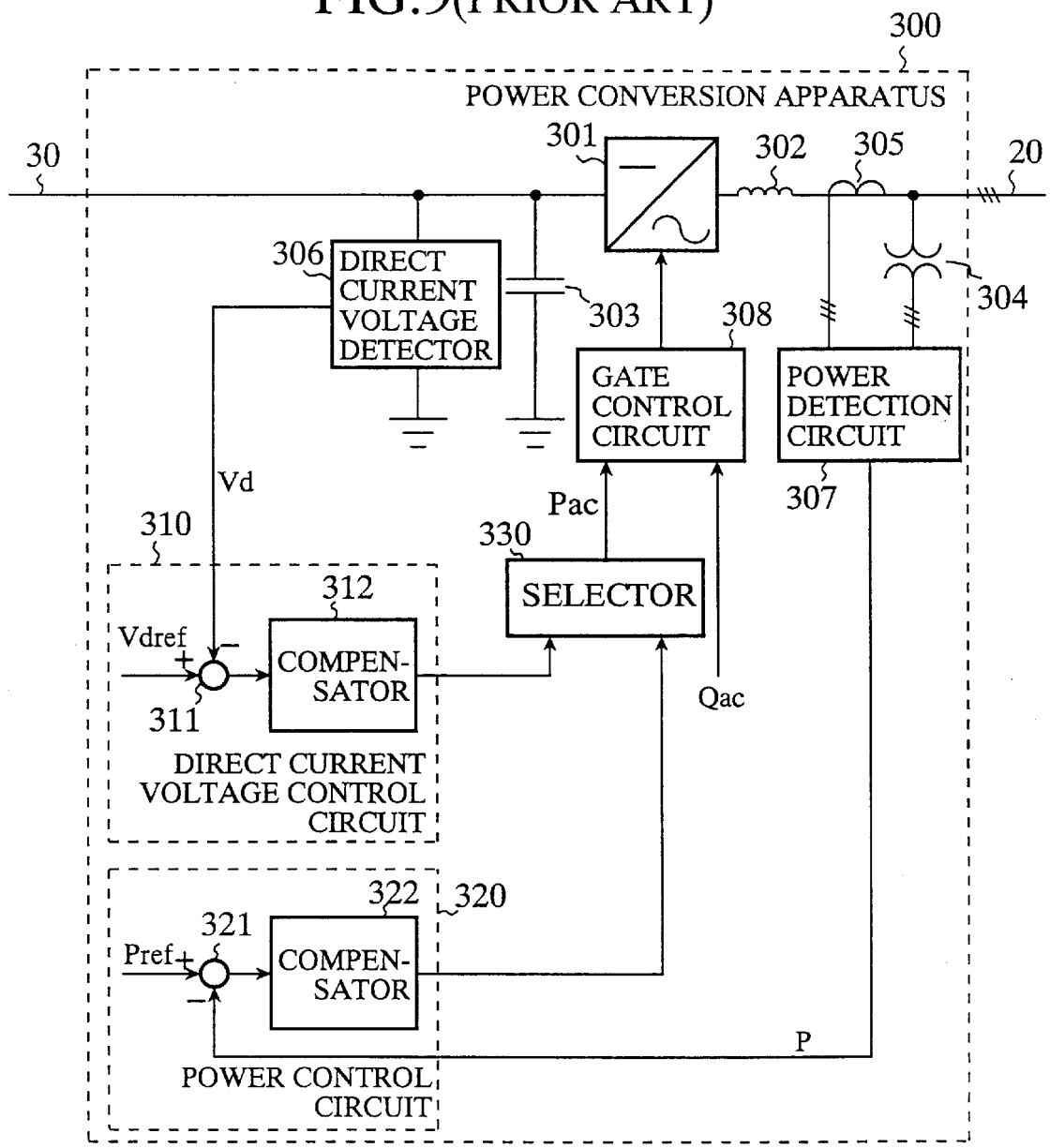
FIG. 9 is a diagram showing a configuration of a conventional power conversion apparatus.
Figure 10:
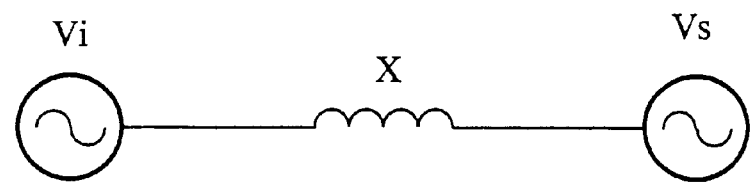
FIG. 10 is a diagram showing a configuration of the voltage type power convertor connected to AC power sources Vi and Vs through an AC reactor.
Figure 10:
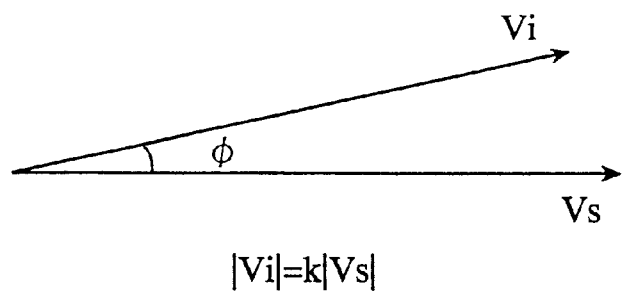
Figure 11:
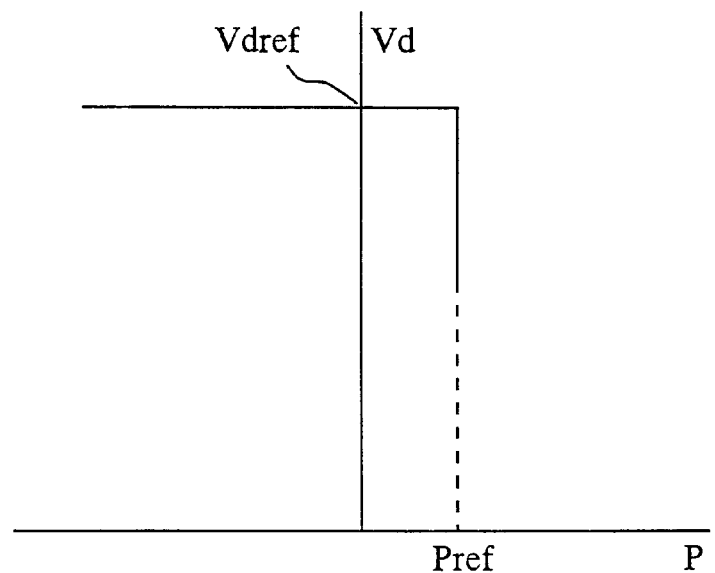
FIG. 11 is a diagram to explain a characteristic of the conventional power conversion apparatus.
Figure 12:
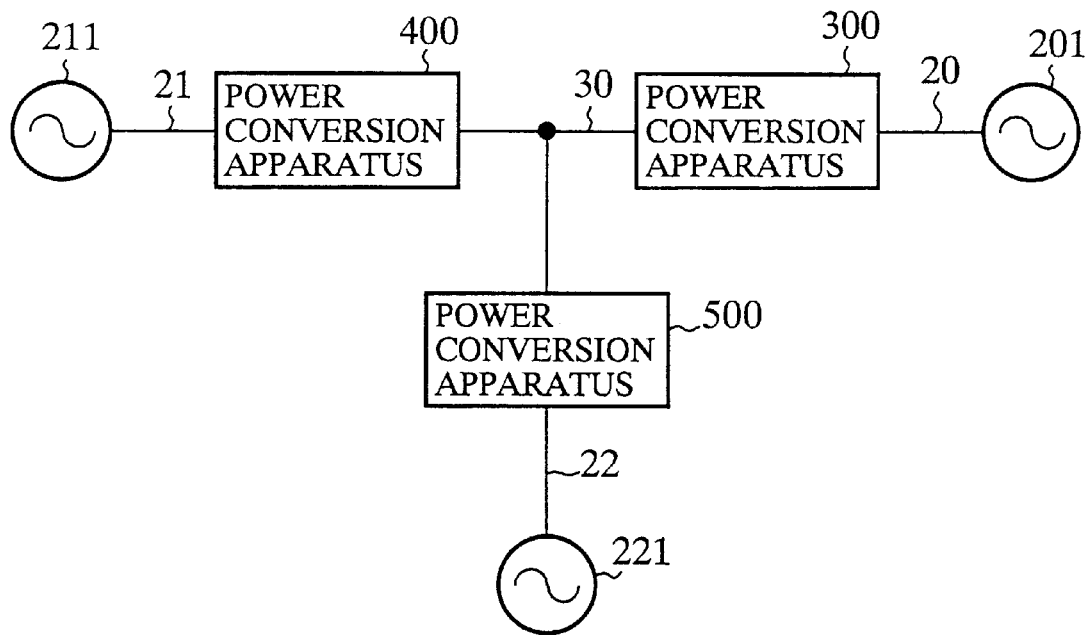
FIG. 12 is a diagram showing a configuration of three conventional power conversion apparatuses connected to DC systems.
Figure 13:
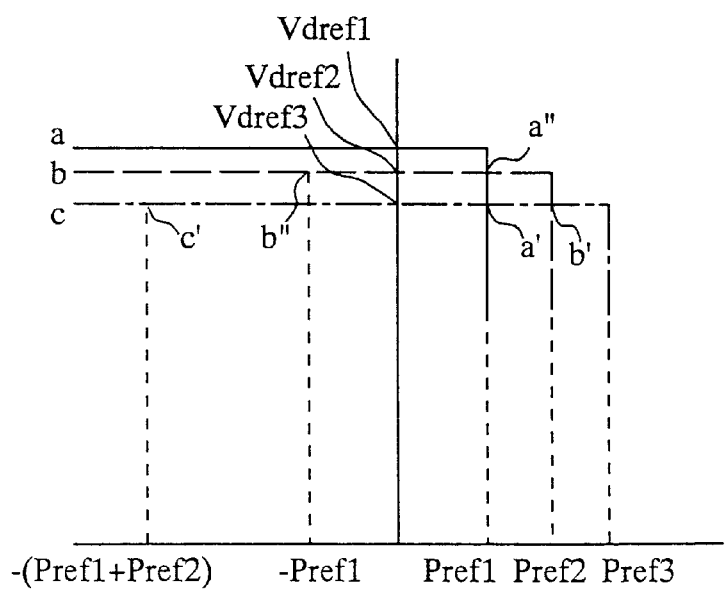
FIG. 13 is a diagram showing a characteristic of the conventional power conversion apparatus.
Figure 14:
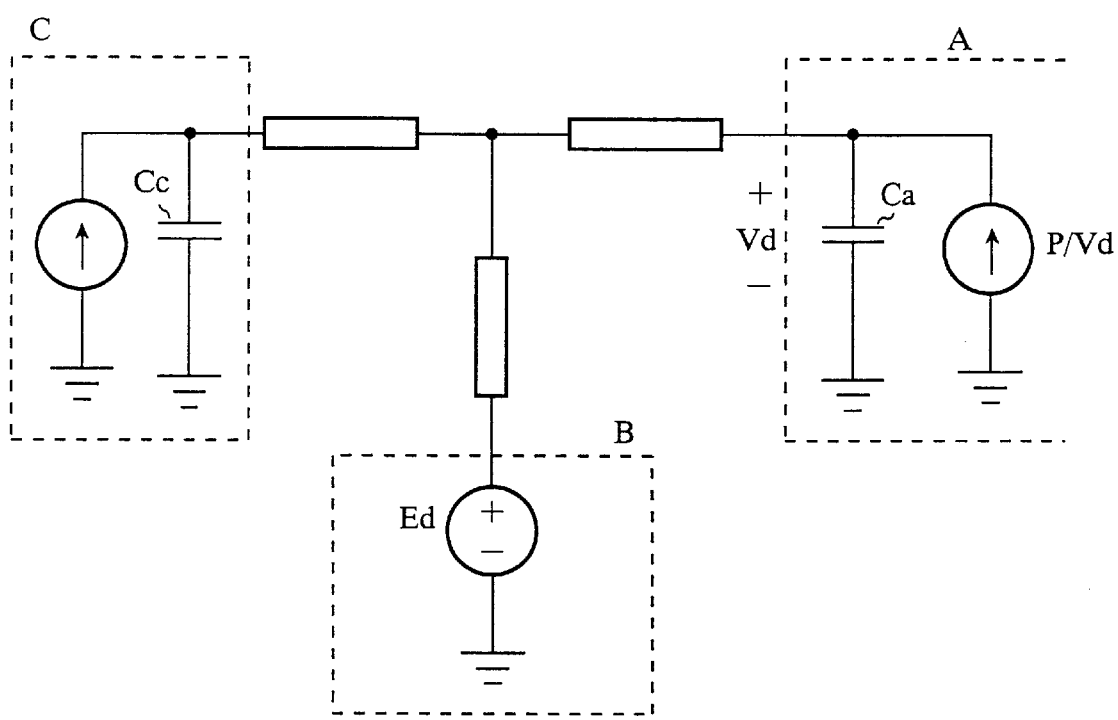
FIG. 14 is a diagram for explaining operation of the conventional power conversion apparatuses.

During the operation of the power control circuit 320, the conventional power conversion apparatus shown in FIG. 9 is equal to the equivalent block diagram of FIG. 3C in which the compensator Gp(s) is added. The voltage control circuit 320 operates so that the voltage Ed of each other terminal connected to the DC system 30 becomes a constant value. In the conventional power conversion apparatus, because the power control circuit 320 is so constructed independently from the loop to be a positive feedback, the power control circuit 320 does not effect the stability of the system. Accordingly, the DC voltage control circuit 310 in other terminals detects the voltage (designated by the reference number Ed shown in FIG. 3C), and adjusts the detected voltage. For this reason, it is required to perform the process in which the DC voltage control circuit 310 operates so that the variation Δvd changes the current ΔId in the DC line, and the change of ΔEd is controlled after the voltages of other terminals as the other power conversion apparatuses connected to the DC system 30 have been changed.

Conversely, even if the capacitor 103 is charged or discharged under the control of the DC voltage control circuit 110 in other power conversion apparatus of other terminals, a delay ensues because the value Δvd is changed after the current in the DC line is changed. Specifically, when the length of lines in the DC system is long and the inductance Ld of the DC system becomes large, the delay value is increased and the effect of the inductance Ld is notable. Thus, in the conventional power conversion apparatus, it is difficult to maintain the stability because the compensation of the positive feedback loop is performed indirectly.

On the contrary, FIG. 3D shows the block diagram of the power conversion apparatus of the first embodiment shown in FIG. 1. In the power conversion apparatus, according to the first embodiment, as the terminal to adjust a power with a constant level, the DC voltage control circuit 110 is incorporated therein and may operate so that the voltage Vd becomes equal to a reference value.

Because the voltage instruction value Vd* in a stationary state is a constant value, the value ΔVd* becomes zero, namely ΔVd*=0.

At this time, when the voltage Vd is decreased, because ΔVd<0, ΔVd*−ΔVd>0, the compensator Gv(s) amplifies the voltage Vd in order to flow the current of ΔIc>0, so that the capacitor 103 is charged. Thereby, in the rectifier operation, it is possible to directly compensate the current in the positive feedback loop to discharge the capacitor 103 through the block Ic0/Vd0 from the voltage ΔVd, as shown in FIG. 3D, during the backward conversion operation.

When the voltage Vd is increased, because the relationship ΔVd*−ΔVd<0 is satisfied, the current ΔIc flows from the capacitor 103 in discharging. Thereby, the current in the positive feedback loop may be compensated directly. Accordingly, in the power conversion apparatus having the configuration shown in FIG. 1, the positive feedback loop is directly compensated, and it is thereby possible to keep the stability of the system comprising the power conversion apparatuses.

As described above, according to the power conversion apparatus of the first embodiment, the DC voltage control circuit 110 incorporated in each of the power conversion apparatuses connected to the DC system 30 controls to keep the DC voltage in a constant voltage level. It is therefore possible to suppress an unstable state in the inverter operation.

Second Embodiment

Figure 4:
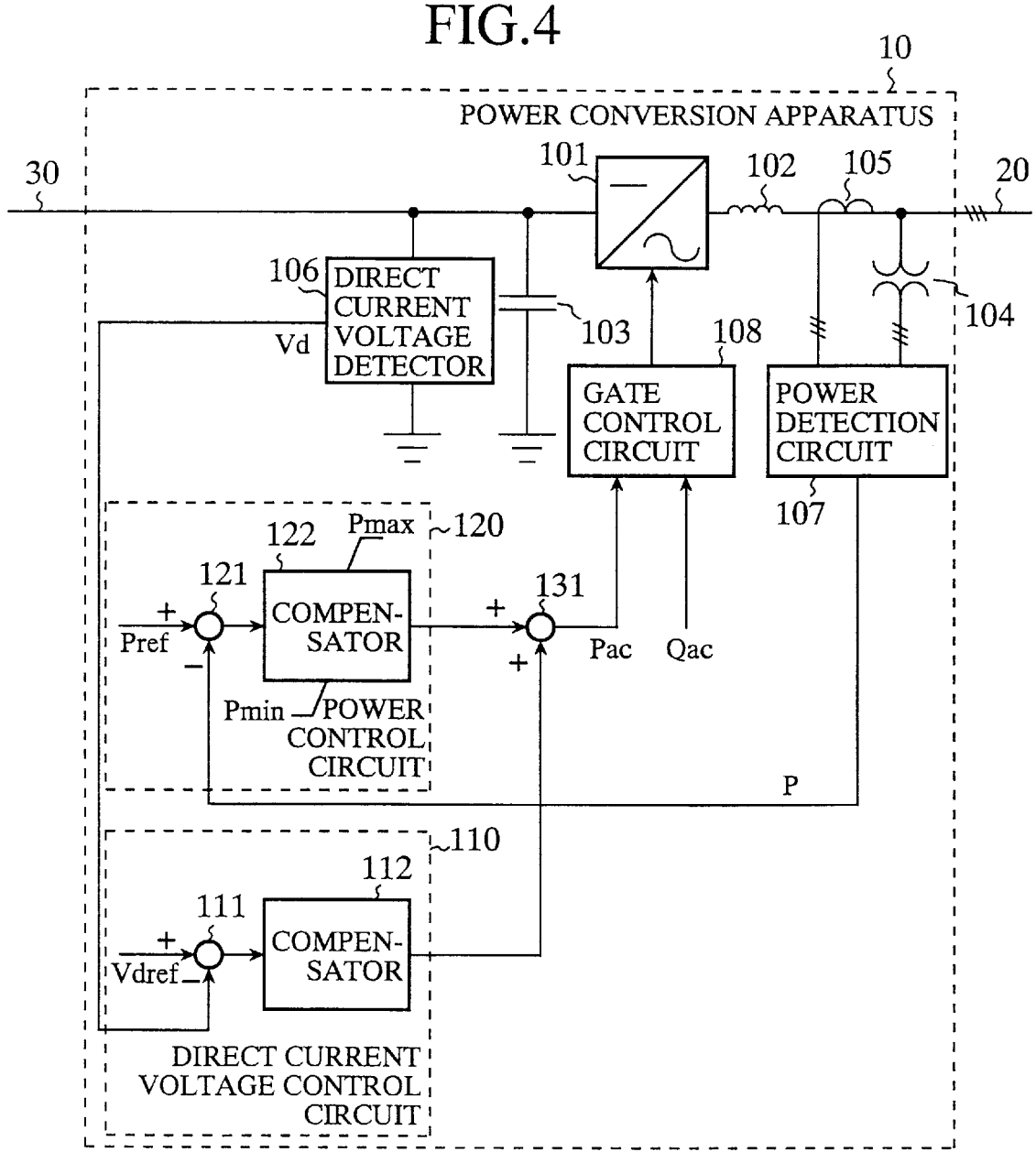
FIG. 4 is a diagram showing a configuration of a power conversion apparatus as second and third embodiments according to the present invention.

FIG. 4 is a diagram showing a configuration of the power conversion apparatus as the second embodiment according to the present invention. As shown in FIG. 4, output limit values such as an upper limit value and a lower limit value are set in the compensator 122 in the power control circuit 120. The upper limit value is designated by Pmax and the lower limit value is designated by Pmin.

Other components in the power conversion apparatus of the second embodiment are the same as those of the power conversion apparatus of the first embodiment, therefore, the explanation of them is omitted here for brevity.

Next, a description will now be given of the operation of the power conversion apparatus of the second embodiment.

In the power conversion apparatus of the second embodiment shown in FIG. 4, because the compensator 122 in the power control circuit 120 has the output limit values Pmax and Pmin, when a deviance between the power reference value Pref and the AC active power P occurs, the deviance of the AC active power is adjusted within those limit values. When the compensator 122 outputs the reference signal indicating to output the power lower or higher than the power limit value, the control signal is compared with the upper limit value Pmax or the lower limit value Pmin. As a result, the output of the compensator 122 is limited. Then, the DC voltage control circuit 110 may perform preferentially, so that there is the deviance between the power reference value Pref and the AC active power P. In particular, when Pmin=Pmax, the power conversion apparatus 10 outputs a power of a constant level.

Next, we will consider a case of the power conversion apparatus of the second embodiment when a plurality of terminals as the power conversion apparatuses are connected to the DC system, and one terminal is disconnected by fault or failure.

In a case in which N terminals are connected to the DC system and each active power is Pi, there is no supply power other than the power from the terminals, therefore, the following relationship is satisfied:

$$\Sigma Pi=0.$$

When the n-th terminal enters a failure, namely disconnected from the DC system, the deviation of the DC voltage and the deviation of the power occur.

The deviation of the DC voltage is zero before one terminal enters the failure, namely disconnected to the DC system, and the power is adjusted to a constant level. The deviation of the DC voltage is ΔVd after one terminal enters the failure, and the deviation to the output Pi of the power control circuit 120 before one terminal is disconnected from the DC system is ΔPi. The active power Pi' after the one terminal is disconnected becomes the following value in a steady state:

$$Pi'=(Pi+\Delta Pi)+Kvi^*\Delta Vi \qquad (4)$$

where, Kvi is a DC gain of the compensator 112 in the DC voltage control circuit 110, and Kvi*ΔVd is an output of the DC voltage control circuit 110.

Because it is required to take the balance of the power after one terminal is disconnected, the sum of Pi of remained terminals becomes zero, namely:

$$\Sigma Pi'=-Pn+\Sigma \Delta Pi+\Delta Vd^*\Sigma Kvi=0. \qquad (5)$$

ΔVd is then obtained and the obtained Δvd is given into the equation (4), so that the following result ieobtained:

$$Pi'=Pi+\Delta Pi+Kvi^*(Pn-\Sigma \Delta Pk)/(\Sigma Kvk). \qquad (6)$$

For example, the limit value in each compensator 112 is set so that the DC gain of the compensator 112 in the DC voltage control circuit 110 in each power conversion apparatus as each terminal is equal to each other, namely Kvi*Kv, and output deviations of the compensator 112 in the DC voltage control circuit 110 in both the increasing direction and decreasing direction are equal when comparing with the value before one terminal enters failure, namely ΔPimax=±ΔPmax.

Specifically, the limit values of the power control circuit 120 in the power conversion apparatus shown in FIG. 1 is Pmax=Pi+ΔPmax and Pmin=Pi−ΔPmax.

When one rectifier terminal (as the power conversion apparatus to convert the DC power to AC power) is disconnected from the DC system, and the DC voltage is then decreased when compared with the DC voltage before disconnection from the DC system, the DC voltage control circuit 110 increases the power in the positive direction (the rectifier operation) in proportion to the deviation ΔVd. Further, the DC voltage control circuit 110 operates so that the power is decreased, conversely. However, this operation is limited by the limit values in the compensator 122, so that ΔPi=−ΔPmax.

On the contrary, one inverter terminal (as the power conversion apparatus to convert the AC power to DC power) is disconnected from the DC system, and the DC voltage is then increased when comparing with the DC voltage before disconnection from the DC system, the DC voltage control circuit 110 decreases the power. However, this operation is limited by the limit values in the compensator 122, so that ΔPi=+ΔPmax.

Thereby, we obtain Pi' as follows:

$$Pi'=Pi+Pn/(n-1). \qquad (7)$$

Accordingly, even if one terminal enters failure, it is possible to perform the operation continuously by shifting a current operation point to a new operating point by providing the power among the terminals. Although the above description has explained the case of Kvi=ΔPi for brevity, it is possible to shift a new operation point even if there is a case in which Kvi is not equal to ΔPi. Furthermore, even if a plurality of terminals (as the power conversion apparatuses) enter failure, it is possible to shift a new operation point.

As described above, according to the power conversion apparatus of the second embodiment, because the output limit values of the power control circuit 120 are set, even if one power conversion apparatus as one terminal connected to the DC system enters failure, it is possible to shift a current operation point to a new operation point by performing the operation of remained power conversion apparatuses connected to the DC system.

Third Embodiment

In the power conversion apparatus of the third embodiment, a different limit value is set into the compensator 122 incorporated in the power control circuit 120 in each power conversion apparatus 10 as each terminal. The operation to maintain the stability of the DC power performed by the power conversion apparatus of the third embodiment is the same as that of the power conversion apparatus of the first and second embodiments.

Other components of the power conversion apparatus of the third embodiment are the same as those of the power conversion apparatus of the first and second embodiments, therefore the explanation of them is omitted here for brevity.

Hereinafter, a description will be given of the operation of the case in which one or more terminals connected to the DC system enter failure and they are disconnected from this DC system.

Although the power control circuit 120 operates so that the AC active power P becomes equal to the power reference value Pref, the ability of this power control circuit 120 is limited by the limit values Pmin and Pmax.

Thereby, the ability of the power control circuit 120 in the terminal (namely, in the power conversion apparatus) having a large limit value becomes large. In this case, the deviation between the AC active power P and the power reference value Pref becomes a small value when comparing with the deviation of a terminal as a power conversion apparatus having smaller limit values.

Accordingly, in the terminal having the larger limit values, it is possible to decrease influence to the AC system 20 because the change of powers after and before the terminal is disconnected from the DC system becomes a small value.

For example, in the equation (6), when the DC gain Kvk in each terminal (as each power conversion apparatus connected to the DC system) is the same value, Because ΣKvk=(n−1) Kv, Kvi=Kv, We obtain the following equation:

$$Pi'=Pi+\Delta Pi+(Pn-\Sigma \Delta Pk)*1/(n-1).$$

When the mean value of ΔP is ΔPav=ΣΔPk/(n−1), ΔPi is defined, namely ΔPi=ΔPav+ΔPdi, thereby, $$Pi'=Pi+(\Delta Pav+\Delta Pdi)+Pn/(n-1)-\Delta Pav=Pi+\Delta Pdi+Pn/(n-1). \qquad (8)$$

When one inverter terminal is disconnected from the DC system, we obtain Pn<0. Because the DC voltage is increased, the DC voltage control circuit 110 decreases the power, and the power control circuit increases the power, ΔPi becomes a positive value.

Accordingly, when the limit value in the power control circuit is set as follows:

$$\Delta Pdi>-Pn/(n-1). \qquad (9)$$

The power control circuit 120 does not saturate, and the power of the terminal incorporating this power control circuit 120 is controlled so that this power becomes equal to the power before the terminal is disconnected.

Even if the output of the power control circuit 120 is saturated and the output is limited, a terminal having a larger upper limit value of the power control circuit 120 and a larger ΔPdi controls a smaller additional power to be supplied. The operation of the terminal having the smaller upper limit value of the power conversion circuit 120 is shifted to an operation point in which the additional power to be supplied is greater.

When a rectifier terminal is disconnected from the Dc system, Pn>0 is satisfied. In this case, because the DC voltage is decreased, the DC voltage control circuit performs so that the power is increased and the power control circuit 120 operates so that the power is decreased. ΔPi is a negative value. Accordingly, when a limit value of the power control circuit 120 in each terminal is set as follows:

$$\Delta Pdi<-Pn/(n-1), \qquad (10)$$

the power control circuit 120 does not saturate and the power is kept to the power before the terminal is disconnected. Even if when the power control circuit 120 is saturated, a terminal having the lower limit value of a small value (namely, a greater absolute value in negative direction) is shifted to an operation point providing a small power change, and a terminal having the lower limit value of a larger value (namely, a smaller absolute value in negative direction) is shifted to an operation point providing a greater power change.

As described above, according to the power conversion apparatus of the third embodiment, because a limit value for an output of the power control circuit 120 in each power conversion apparatus 10 is set with a different value, even if one or a plurality of power conversion apparatuses stop or disconnected from the DC system and remained power conversion apparatuses performs operation continuously, it is possible to set the power conversion apparatuses capable of supplying large powers and small powers, independently.

Fourth Embodiment

Figure 5:
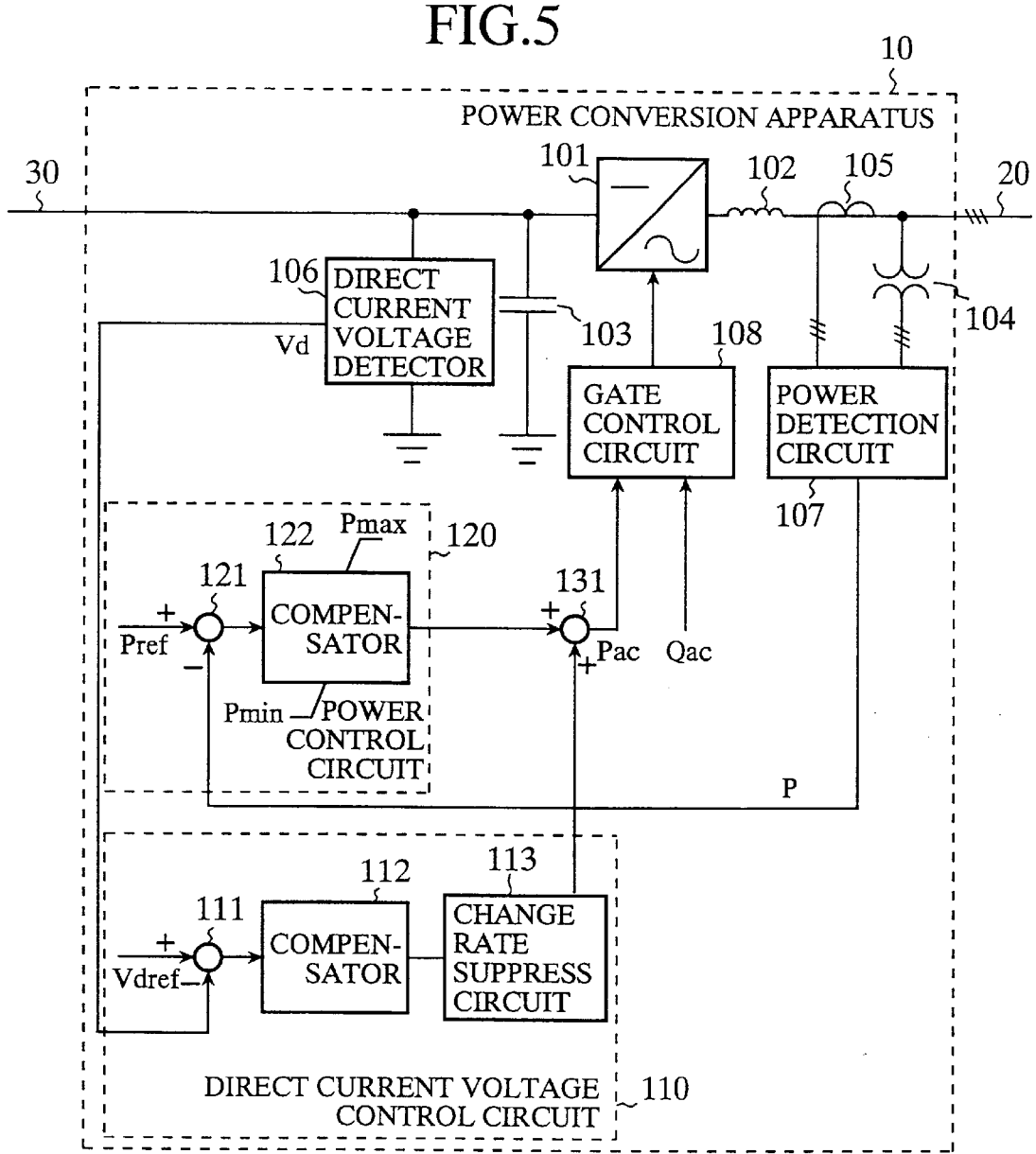
FIG. 5 is a diagram showing a configuration of a power conversion apparatus as a fourth embodiment according to the present invention.

FIG. 5 is a diagram showing a configuration of the power conversion apparatus as the fourth embodiment according to the present invention. In FIG. 5, the reference number 113 designates a change rate suppress circuit, incorporated in the DC voltage control circuit 110, to suppress or control the change rate of the input signal per time transmitted from the compensator 112. Other components of the power conversion apparatus of the fourth embodiment are the same as those of the power conversion apparatus of the first and second embodiments, therefore the explanation of them is omitted here for brevity.

Next, a description will be given of the operation of the power conversion apparatus of the fourth embodiment.

In the power conversion apparatus of the fourth embodiment, the DC voltage control circuit 110 to suppress the change caused by the resonance in the DC system is so designed that it may respond to an abrupt change of the DC voltage caused by disconnecting of one terminal from the DC system, for example.

The compensator 112 in the DC voltage control circuit 110 amplifies the deviation of the DC voltage Vd from the DC voltage reference value Vdref. In addition to this operation, the output of the compensator 112 is also changed according to the abrupt change of the DC voltage Vd.

The change rate suppress circuit 113 operates so that the change rate of the output of the compensator 112 is suppressed within the maximum change rate when the change rate is greater than the maximum change rate of the output of the compensator 112 that has been set in advance in the compensator 112.

When the change rate of the output from the compensator 112 is smaller than the maximum change rate that has been set in the compensator 112, the compensator 112 outputs the change rate of the DC voltage without any suppression, so that the output of the compensator 112 becomes the active power reference signal without any changing. Thereby, in a steady state, it is possible to control a transitional change of the DC voltage without decreasing the effect of the DC voltage control obtained by the DC voltage control circuit 110.

On the other hand, when a filter is incorporated in the compensator 112 in order to suppress the transitional change of the DC voltage, it has a possibility to disturb the steady state of the control for the DC system.

Figure 6A:
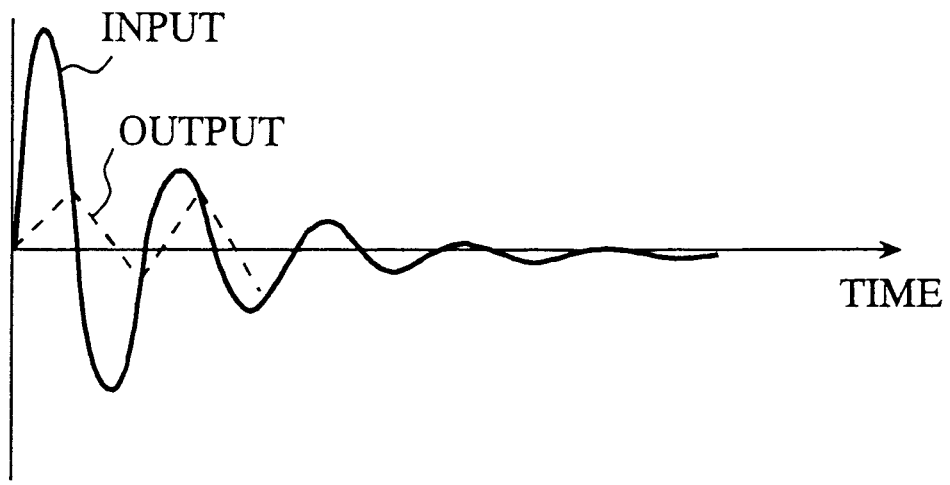
FIGS. 6A and 6B are diagram showing one example of a characteristic of the change rate suppress circuit of the fourth embodiment.
Figure 6B:
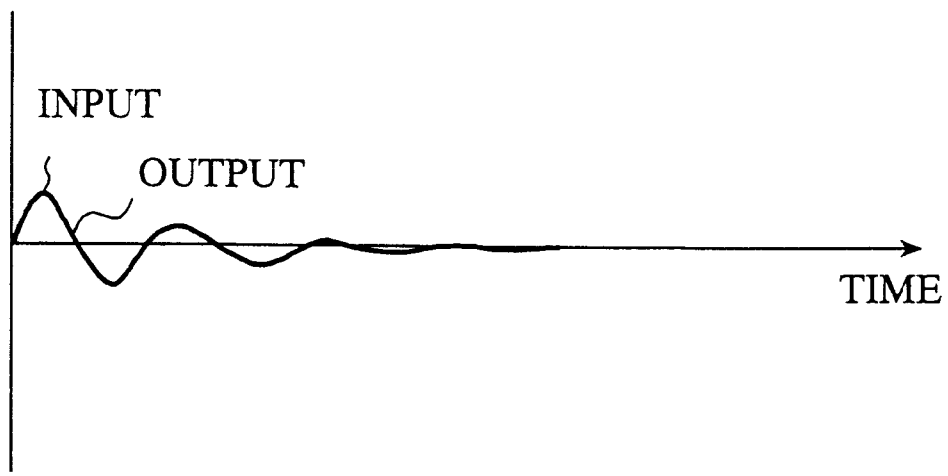

FIGS. 6A and 6B are diagram showing one example of the characteristic of the change rate suppress circuit 113 of the fourth embodiment. The horizontal axis indicates time and the vertical axis denotes the amplitude of a signal. Specifically, FIG. 6A shows an example when the input signal, designated by the solid line, is over the maximum change rate, and the change rate of the output (dashed line) is suppressed. FIG. 6B shows an example when the change rate of the input signal, designated by the solid line, is smaller than the maximum change rate. In this case shown in FIG. 6B, the output signal is equal to the input signal in the change rate suppress circuit 113. Thereby, it is possible to control the abrupt change of the active power, so that it is possible to reduce a power deviation in the AC system 20 caused by the abrupt change of the DC voltage in the DC system 30.

Because the operation of the power control circuit 120 provides no adverse influence to the stability of the DC voltage control system, it is acceptable to incorporate a filter to the compensator 122 so that the compensator 122 has the filter function.

As described above, according to the power conversion apparatus of the fourth embodiment, the change rate suppress circuit 113 incorporated in the DC voltage control circuit 110 can control the transitional change of the active power efficiently.

Fifth Embodiment

The power conversion apparatus of the fifth embodiment has the following feature:

A different set value is set in the change rate suppress circuit 113 in the DC voltage control circuit 110 in each power conversion apparatus, as each terminal. Other components of the power conversion apparatus of the fifth embodiment are the same as those of the power conversion apparatus of the fourth embodiment, therefore the explanation of them is omitted here for brevity.

When one terminal is disconnected from the Dc system, so that the magnitude of the DC voltage is abruptly changed, the power conversion apparatus 10 of the fifth embodiment having the maximum value in the maximum change rates in a plurality of terminals connected to the DC system 30 preferentially operates in order to suppress an abrupt change of the DC voltage.

On the contrary, in the power conversion apparatus, as other terminal, having a maximum change rate of a smaller value, the response to a transitional change of the DC voltage is suppressed, so that the magnitude of the transitional power supply to be used for maintaining the stable DC voltage becomes small, and it is possible to obtain a small influence to the AC system.

As described above, according to the power conversion apparatus of the fifth embodiment, a different set value is set in the change rate suppress circuit 113 in the DC voltage control circuit 110 incorporated in each power conversion apparatus, namely as each terminal. It is thereby possible to set one terminal in order to preferentially suppress the abrupt change of the DC voltage when one or more terminals are disconnected from the DC system.

Sixth Embodiment

Figure 7:
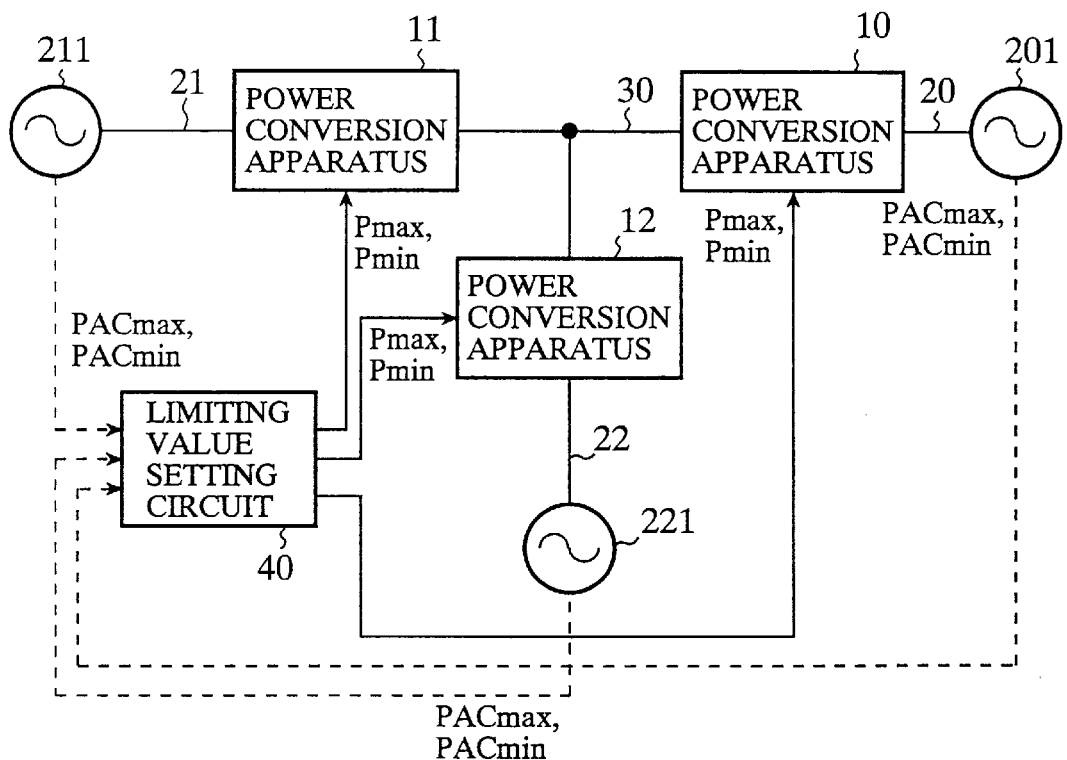
FIG. 7 is a diagram showing a configuration of a power conversion apparatus as a sixth embodiment according to the present invention.

FIG. 7 is a diagram showing a configuration of the connection of the power conversion apparatuses as the sixth embodiment according to the present invention. In FIG. 7, each of the reference numbers 10, 11, and 12 designates the power conversion apparatus. Each of the power conversion apparatuses 10, 11, and 12 has the configuration as the second embodiment shown in FIG. 4, for example. The reference numbers 20, 21, and 22 denote AC systems, 40 indicates a limiting value setting circuit to set the limiting value of the compensator 122 in the power control circuit 120 in each of the power conversion apparatuses 10, 11, and 12. Each of the reference numbers 201, 211, and 221 designates the AC power source.

Next, a description will be given of the power conversion apparatus of the sixth embodiment.

In the compensator 122 in the power control circuit 120 shown in FIG. 4, the output limit value has been set. The limit value setting circuit 40 in the configuration of the power conversion apparatuses as the sixth embodiment receives the power ranges indicated by the values PACmax and PACmin indicating an acceptable power range by each of the AC systems 20, 21, and 22 connected to each of the power conversion apparatuses 10, 11, and 12, and then outputs the limit values Pmax and Pmin to be used for the compensator 122 in the power control circuit 120 in each of the power conversion apparatuses 10, 11, and 12.

In the power conversion apparatus of the second embodiment shown in FIG. 4, the operation of the power control circuit 120 incorporating the compensator 122 having a smaller output limit value is limited and the power conversion apparatus supplies the power in order to maintain the DC voltage. Accordingly, the limit value setting circuit 40 sets both the limit values Pmax and Pmin for each power conversion apparatuses 10, 11, and 12 so that a smaller limit value is set to the power conversion apparatus having a larger power permission range of PACmax and PACmin in order to easily supply the power when one or more power conversion apparatuses stop.

On the contrary, the limit value setting circuit 40 sets both the limit values Pmax and Pmin for each power conversion apparatuses 10, 11, and 12 so that a larger limit value is set to the power conversion apparatus having a smaller power permission range of PACmax and PACmin in order to execute the power control circuit 120. Thereby, the AC active power P becomes equal to the power reference value Pref and the amount of the additional power supply is decreased.

As described above, according to the power conversion apparatuses having the configuration of the sixth embodiment shown in FIG. 7, it is possible to set the amount of the additional power supply of each power conversion apparatus corresponding to the ability of each AC system when one or a plurality of power conversion apparatuses stop. This causes to decrease the bad influence to each AC system as small as possible.

Although FIG. 7 shows the configuration of the connection as sixth embodiment in which three power conversion apparatuses 10, 11, and 12 are connected to the DC system 30, the present invention is not limited by this. That is, the present invention has the same effect when two or more power conversion apparatuses are connected to the DC system 30.

Seventh Embodiment

Figure 8:
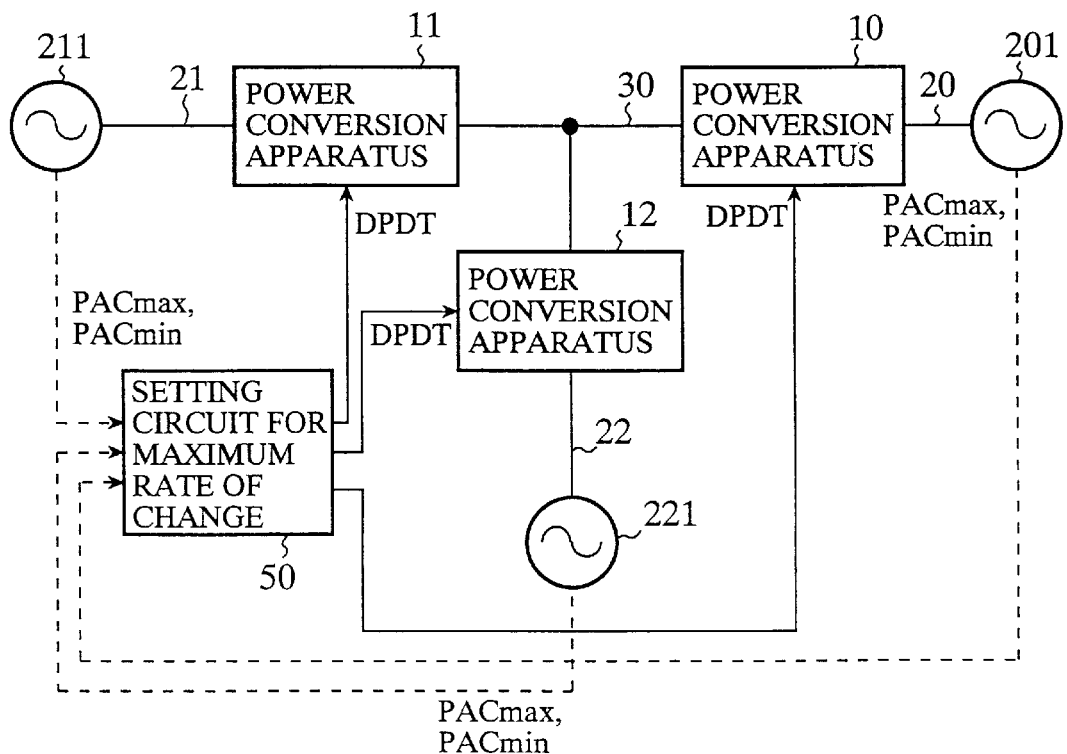
FIG. 8 is a diagram showing a configuration of a power conversion apparatus as a seventh embodiment according to the present invention.

FIG. 8 is a diagram showing a configuration of the connection of the power conversion apparatuses as the seventh embodiment according to the present invention. In FIG. 8, the reference number 50 designates a maximum change rate setting circuit to set a maximum change rate of the DC voltage control circuit 110. Other components of the power conversion apparatus of the seventh embodiment are the same as the configuration of the power conversion apparatuses of the sixth embodiment, therefore the explanation of them is omitted here for brevity.

Next, a description will be given of the operation of the configuration of the connection comprising the three power conversion apparatuses 10, 11, and 12, and the maximum change rate setting circuit 50.

For example, each of the power conversion apparatus 10, 11, and 12 in the connection as the seventh embodiment is the same as that of the power conversion apparatus of the fourth embodiment shown in FIG. 5. The power conversion apparatus of the fourth embodiment shown in FIG. 5 incorporates the change rate suppress circuit 113.

The maximum change rate setting circuit 50 receives the permission power range of PACmax and PACmin of each of the AC systems 20, 21, and 22 connected to each of the power conversion apparatuses 10, 11, and 12, and outputs the maximum change rate for the DC voltage control circuit 110 in each of the power conversion apparatus 10, 11, and 12.

In the configuration of the power conversion apparatus of the fourth embodiment shown in FIG. 5, a transitional power supply performed by the power conversion apparatus having a small value of the maximum change rate is suppressed, and a transitional power supply performed by the power conversion apparatus having a large value of the maximum change rate is increased. Accordingly, the maximum change rate DPDT of the power conversion apparatus is set in proportion to the power permissible range of PACmax and PACmin of the AC system connected to the power conversion apparatus in order to supply a transitional power efficiently that is performed when one or more power conversion apparatuses stop. That is, when the power conversion apparatus has a large value of the power permission range, its maximum change rate becomes large in order to progress a transitional power supply. On the other hand, when the power conversion apparatus has a small value of the power permission range, its maximum change rate becomes small in order to suppress a transitional power supply.

As described above, according to the power conversion apparatuses having the configuration of the seventh embodiment, it is possible to set a transitional power supply performed by each power conversion apparatus in proportion to the ability of each AC system when the operations of one or more power conversion apparatuses stop. It is thereby possible to reduce a power deviation in the AC systems as small as possible.

Although FIG. 8 shows the configuration of the connection as the seventh embodiment in which three power conversion apparatuses 10, 11, and 12 are connected to the DC system 30, the present invention is not limited by this. That is, the present invention has the same effect when two or more power conversion apparatuses are connected to the DC system 30.

Eighth Embodiment

In the configuration of the connection of the power conversion apparatuses as the eighth embodiment, a different DC gain Kvi is set in the compensator 112 in the DC voltage control circuit 110 in each power conversion apparatus (namely, in each terminal) having the configuration shown in FIG. 4. Accordingly, the configuration of the connection of the power conversion apparatuses as the eighth embodiment is the same the configuration of the seventh embodiment, therefore the explanation of the configuration is omitted here for brevity.

In the following description, for brevity, we assume that a same value $\Delta Pi$ for the DC voltage control circuit 110 is set in each terminals.

When we will define that a mean value of the DC gain of the terminals is Kvav, $Kvav=\Sigma Kvk/(n-1)$, and $Kvi = Lvav*Kvdi$, the following equations are introduced:

$$Pi'=Pi+\Delta Pi+Kvav*Kvdi*(Pn-(n-1)\Delta Pi)/(n-1)Kvav=Pi+(1-Kvdi)\Delta Pi+Kvdi*Pn/(n-1). \qquad (11)$$

When a rectifier terminal is disconnected from the DC system 30, namely Pn>0, the relationship $\Delta Pi<0$ may be satisfied. Accordingly, one power conversion apparatus supplies a more power when the DC gain that is set in the compensator 112 in this power conversion apparatus is greater than the mean value. On the contrary, the operation of a power conversion apparatus shifts an operation point in which the power supply is suppressed when the DC gain that is set in the compensator 112 in this power conversion apparatus is smaller than the mean value, namely Kvdi<1. When an inverter terminal is disconnected from the DC system 30, namely Pn<0, the relationship $\Delta Pi<0$ may be satisfied. In this case, the same operations described above are also performed.

As described above, according to the configuration of the power conversion apparatuses as the eighth embodiment, a different DC gain Kvi is set in the compensator 112 in the DC voltage control circuit 110 in each power conversion apparatus. Thereby even if one or more power conversion apparatuses stop, and remaining power conversion apparatuses connected to the DC system 30 operate, it is possible to set the power conversion apparatuses of a large power supply and a small power supply independently. In the description of the eight embodiment above, each terminal has the same value $\Delta Pi$ of the DC voltage control circuit 110, but the present invention is not limited by this, for example, it is possible to obtain the same effect even if a different value $\Delta Pi$ is set for each terminal.

As set forth above, according to the present invention, because the DC voltage control circuit always operates, it is possible to suppress the variation of the DC voltage at each power conversion apparatus in order to keep the constant DC voltage. It is thereby possible to transmit stable power among the power conversion apparatuses even if DC lines of the DC system become long, and the capacitance of the capacitor is reduced.

According to the present invention, because the output limit value is set in the power control circuit, it is possible to shift the operation point automatically and to continue the operation of remaining power conversion apparatuses even if the operation of one or more power conversion apparatuses stops.

According to the present invention, because a different output limit value is set in the power control circuit in each power conversion apparatus, it is possible to set the rate of a power supply of each remained power conversion apparatus independently, when the operation point is shifted in order to continue the operation of the remained power conversion apparatuses even if the operation of one or more power conversion apparatuses stops.

According to the present invention, because the change rate suppress circuit is incorporated in the DC voltage control circuit in each power conversion apparatus, it is possible to suppress a variation of the AC power of each of remained power conversion apparatuses, even if the operation of one or more power conversion apparatuses stops.

According to the present invention, because a different set value is set into the change rate suppress circuit in the DC voltage control circuit in each power conversion apparatus, it is possible to set the rate of a transitional power supply in each power conversion apparatus immediately following the stop operation of one or more power conversion apparatuses.

According to the present invention, because the output limit value in the power control circuit in each power conversion apparatus is set according to the ability of the power supply for each AC system, it is possible to suppress a power deviation in each AC system during transitional power supply operation caused immediately following the stop operation of one or more power conversion apparatuses.

According to the present invention, because a set value of a maximum change rate in the DC voltage control circuit in each power conversion apparatus is set according to the ability of the power supply for each AC system, it is possible to suppress a power deviation in each AC system during transitional power supply operation caused immediately following the stop operation of one or more power conversion apparatuses.

According to the present invention, because a different value of the DC gain is set for the DC voltage control circuit in each power conversion apparatus, it is possible to set the rate of a power supply of each remaining power conversion apparatus independently, when the operation point is shifted in order to continue the operation of the remaining power conversion apparatuses even if the operation of one or more power conversion apparatuses stops.

While the above provides a full and complete disclosure of the preferred embodiments of the present invention, various modifications, alternate constructions and equivalents may be employed without departing from the scope of the invention. Therefore the above description and illustration should not be construed as limiting the scope of the invention, which is defined by the appended claims.

What is claimed is:

1. A power conversion apparatus in a plurality of power conversion apparatuses forming a power system, each apparatus including a voltage type power convertor for converting a DC power to a AC power or the AC power to the DC power and for supplying a converted power, connected to DC lines, comprising:

direct current voltage detection means for detecting the DC voltage of each voltage type power converter;

power detection means for detecting the power converted from the AC power to the DC power or from the DC power to the AC power by the voltage type power convertor;

power control means for outputting a first active power reference signal for the voltage type power convertor based on a power reference value and a detected value detected by the power detection means;

direct current control means for outputting a second active power reference signal for the voltage type power convertor based on a direct current voltage reference value and a detected value detected by the direct current voltage detection means; and an adder receiving the first active power reference signal and the second active power reference signal and supplying an active power instruction signal;

gate control means for firing switching elements incorporated in the voltage type power convertor based on the active power instruction signal.

2. A power conversion apparatus in a plurality of power conversion apparatuses forming a power system, each apparatus including a voltage type power convertor for converting a DC power to a AC power or the AC power to the DC power and for supplying a converted power, connected to DC lines, comprising:

direct current voltage detection means for detecting the DC voltage of each voltage type power converter;

power detection means for detecting the power converted from the AC power to the DC power or from the DC power to the AC power by the voltage type power convertor;

power control means for outputting a first active power reference signal for the voltage type power convertor based on a power reference value and a detected value detected by the power detection means;

direct current control means for outputting a second active power reference signal for the voltage type power convertor based on a direct current voltage reference value and a detected value detected by the direct current voltage detection means; and gate control means for firing switching elements incorporated in the voltage type power convertor based on the first active power reference signal and the second active power reference signal, wherein an output limit value for limiting a magnitude of the first active power reference signal is set in the power control means, and the magnitude of the first active power reference signal output from the power control means is limited based on the limit value.

3. A power conversion apparatus in a plurality of power conversion apparatuses forming a power system, each apparatus including a voltage type power convertor for converting a DC power to a AC power or the AC power to the DC power and for supplying a converted power, connected to DC lines, comprising:

direct current voltage detection means for detecting the DC voltage of each voltage type power converter;

power detection means for detecting the power converted from the AC power to the DC power or from the DC power to the AC power by the voltage type power convertor;

power control means for outputting a first active power reference signal for the voltage type power convertor based on a power reference value and a detected value detected by the power detection means;

direct current control means for outputting a second active power reference signal for the voltage type power convertor based on a direct current voltage reference value and a detected value detected by the direct current voltage detection means; and gate control means for firing switching elements incorporated in the voltage type power convertor based on the first active power reference signal and the second active power reference signal, wherein a different output limit value is set in each power control means for each voltage type power convertor in each power conversion apparatus.

4. A power conversion apparatus in a plurality of power conversion apparatuses forming a power system, each apparatus including a voltage type power convertor for converting a DC power to a AC power or the AC power to the DC power and for supplying a converted power, connected to DC lines, comprising:

direct current voltage detection means for detecting the DC voltage of each voltage type power converter;

power detection means for detecting the power converted from the AC power to the DC power or from the DC power to the AC power by the voltage type power convertor;

power control means for outputting a first active power reference signal for the voltage type power convertor based on a power reference value and a detected value detected by the power detection means;

direct current control means for outputting a second active power reference signal for the voltage type power convertor based on a direct current voltage reference value and a detected value detected by the direct current voltage detection means; and gate control means for firing switching elements incorporated in the voltage type power convertor based on the first active power reference signal and the second active power reference signal, wherein the direct current voltage control means of each voltage type power convertor further comprises a change rate suppress means to suppress a change rate per time of an output signal transferred from the direct current voltage detection means.

5. A power conversion apparatus in a plurality of power conversion apparatuses forming a power system, each apparatus including a voltage type power convertor for converting a DC power to a AC power or the AC power to the DC power and for supplying a converted power, connected to DC lines, comprising:

direct current voltage detection means for detecting the DC voltage of each voltage type power converter;

power detection means for detecting the power converted from the AC power to the DC power or from the DC power to the AC power by the voltage type power convertor;

power control means for outputting a first active power reference signal for the voltage type power convertor based on a power reference value and a detected value detected by the power detection means;

direct current control means for outputting a second active power reference signal for the voltage type power convertor based on a direct current voltage reference value and a detected value detected by the direct current voltage detection means and gate control means for firing switching elements incorporated in the voltage type power convertor based on the first active power reference signal and the second active power reference signal, wherein an output limit value for limiting a magnitude of the first active power reference signal is set in the power control means, and the magnitude of the first active power reference signal output from the power control means is limited based on the limit value, and wherein the direct current voltage control means of each voltage type power convertor further comprises a change rate suppress means to suppress a change rate per time of an output signal transferred from the direct current voltage detection means.

6. A power conversion apparatus in a plurality of power conversion apparatuses forming a power system, each apparatus including a voltage type power convertor for converting a DC power to a AC power or the AC power to the DC power and for supplying a converted power, connected to DC lines, comprising:

direct current voltage detection means for detecting the DC voltage of each voltage type power converter;

power detection means for detecting the power converted from the AC power to the DC power or from the DC power to the AC power by the voltage type power convertor;

power control means for outputting a first active power reference signal for the voltage type power convertor based on a power reference value and a detected value detected by the power detection means;

direct current control means for outputting a second active power reference signal for the voltage type power convertor based on a direct current voltage reference value and a detected value detected by the direct current voltage detection means; and gate control means for firing switching elements incorporated in the voltage type power convertor based on the first active power reference signal and the second active power reference signal, wherein a different output limit value is set in each power control means for each voltage type power convertor in each power conversion apparatus, and wherein the direct current voltage control means of each voltage type power convertor further comprises a change rate suppress means to suppress a change rate per time of an output signal transferred from the direct current voltage detection means.

7. A power conversion apparatus as claimed in claim 4, wherein a different set value is set in the change rate suppress means for each voltage type power convertor in each power conversion apparatus.

8. A power conversion apparatus as claimed in claim 5, wherein a different set value is set in the change rate suppress means for each voltage type power convertor in each power conversion apparatus.

9. A power conversion apparatus as claimed in claim 6, wherein a different set value is set in the change rate suppress means for each voltage type power convertor in each power conversion apparatus.

10. A power conversion apparatus as claimed in claim 3, wherein the different output limit value to be set in the power control means is set according to an ability of power supply of an alternating current system connected to each voltage type power convertor in each power conversion apparatus.

11. A power conversion apparatus as claimed in claim 7, wherein the different limit value to be set in the change rate control means is set according to an ability of power supply of an alternating current system connected to each voltage type power convertor in each power conversion apparatus.

12. A power conversion apparatus as claimed in claim 8, wherein the different limit value to be set in the change rate control means is set according to an ability of power supply of an alternating current system connected to each voltage type power convertor in each power conversion apparatus.

13. A power conversion apparatus as claimed in claim 9, wherein the different limit value to be set in the change rate control means is set according to an ability of power supply of an alternating current system connected to each voltage type power convertor in each power conversion apparatus.

14. A power conversion apparatus as claimed in claim 2, wherein a different direct current amplification factor is set into the direct current voltage control means in each voltage type power convertor in each power conversion apparatus.

15. A power conversion apparatus as claimed in claim 2, wherein the power control means comprises a subtractor and a compensator, the subtractor receives the power reference value and the detected value detected by the power detection circuit, and the output limit value is set in the compensator, and the compensator receives an output from the subtractor, and outputs the first active power reference signal.

16. A power conversion apparatus as claimed in claim 4, wherein the direct current voltage control means comprises a subtractor and a compensator, the subtractor receives the direct current voltage reference value and a direct current voltage value detected by the direct current voltage detection means, and the compensator receives an output from the subtractor and outputs the second active power reference signal.

17. A power conversion apparatus as claimed in claim 4, wherein a maximum change rate that is corresponding to an allowable power supply ability of the AC power connected to each voltage type power convertor is set in the change rate suppress means.

18. A power conversion apparatus as claimed in claim 5, wherein a maximum change rate that is corresponding to an allowable power supply ability of the AC power connected to each voltage type power convertor is set in the change rate suppress means.

19. A power conversion apparatus as claimed in claim 6, wherein a maximum change rate that is corresponding to an allowable power supply ability of the AC power connected to each voltage type power convertor is set in the change rate suppress means.

20. A power conversion apparatus as claimed in claim 1, wherein an output limit value for limiting a magnitude of the first active power reference signal is set in the power control means, and the magnitude of the first active power reference signal output from the power control means is limited based on the limit value.

21. A power conversion apparatus as claimed in claim 1, wherein a different output limit value is set in each power control means for each voltage type power converter in each power conversion apparatus.

* * * * *